Patented June 4, 1935

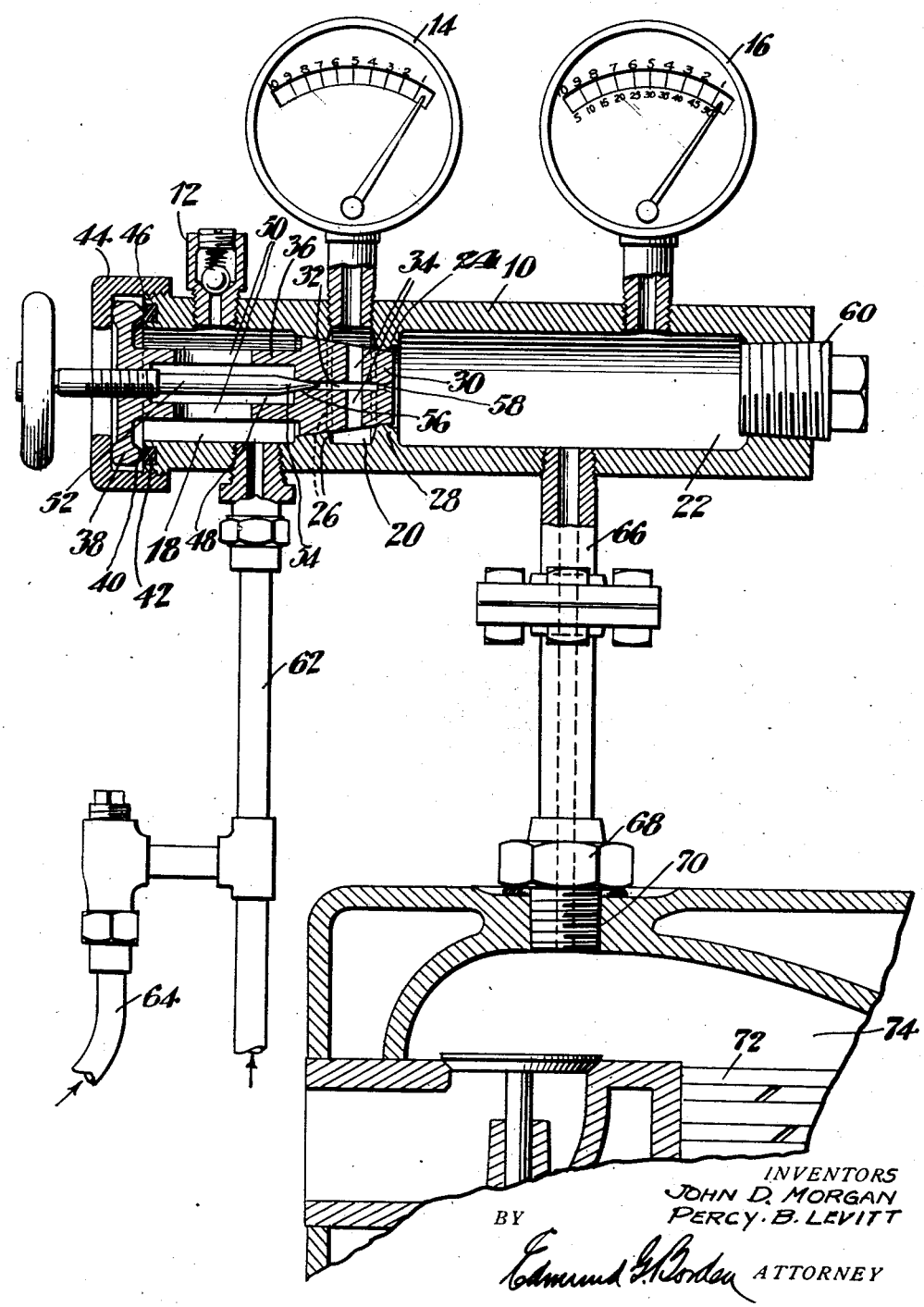

2,003,949

UNITED STATES PATENT OFFICE 2,003,949

GAS ENGINE LEAKAGE TESTER

John D. Morgan, South Orange, N. J., and Percy B. Levitt, Jackson Heights, N. Y., assignors to Doherty Research Company, New York, N. Y., a corporation of Delaware Application December 16, 1932, Serial No. 647,550

2 Claims. (Cl. 137—75)

This invention relates to gas leakage meters, and more particularly to improved apparatus adapted for measuring and locating leakage from power engine cylinders.

Within the past few years there have been developed methods and apparatus for "tuning up" the operation of internal combustion engines by adjustment of the factors of suitably proportioned fuel and air supplies, spark intensity and timing, valve timing, engine cooling, etc., to raise the power efficiency of the engine. Experience in the application of "engine tuning" has shown that satisfactory results are often dependent on preliminary measurement and correction of excess gas leakage from the combustion chamber of the engine undergoing adjustment.

Accordingly, an object of the present invention is to provide flow restricting apparatus adapted for testing the leakage of gas past the pistons and valves of an internal combustion engine cylinder.

Another object of the invention is to provide apparatus of simple design and having operating characteristics which permit of its use by ordinary laymen, for locating and measuring gas leakage from power engine cylinders.

With these and other objects in view, the invention consists in the improved flow restricting apparatus for measuring and locating gas leakage which is hereinafter described and more particularly defined in the accompanying claims.

In the following description the invention will be explained by reference to the attached drawing, in which the single figure is a view in side elevation, with parts in section, illustrating a preferred embodiment of the apparatus as hooked up for actual use.

In the accompanying drawing, 10 designates a manifold block having threaded apertures in one wall thereof into which are screwed a pressure relief valve 12, and two pressure gauges respectively designated 14 and 16. The interior of manifold 10 is divided into three chambers 18, 20 and 22 by centrally apertured or annular partition walls 24 and 26 having inner edges tapered as shown to form a tight seat 28 for a centrally apertured frusto-conical plug 30. The central aperture 32 in plug 30 forms a connecting passage between chambers 18 and 22, and radial apertures 34 in plug 30 in turn connect aperture 32 at a point intermediate its ends with chamber 20 and with gauge 14 connected to said chamber. Formed integral with plug 30 is a stem 36 connecting the plug 30 and a closure cap 38. Cap 38 has a circular inner knife edge rim 40 which cooperates with an annular gasket 42 mounted in a groove in the end wall of manifold 10 to form a sealed end closure for chamber 18. A threaded screw cap 44 engages threads 46 on the periphery of manifold 10 and functions to hold cap 38 in sealing engagement with gasket 42. Stem 36 is constructed with a central aperture 48 and radial apertures 50 connecting passage 32 in plug 30 with chamber 18. Closure cap 38 and screw cap 44 are axially bored and cap 38 is tapped to form a threaded bearing for the stem 52 of a needle valve 54. A cone seat 56 for valve 54 is formed at the end of passage 32 opening out from chamber 18. At the other or discharge end of passage 32 there is mounted a flow restricting orifice 58 which may be either formed integral with or adjustably secured to the end of plug 30. The end of manifold 10 opposite that on which screw cap 44 is mounted is closed by a threaded plug 60. An air inlet pipe 62, connected to a source (not shown) of high pressure air or other gas, is threaded into the wall of chamber 18. Pipe 62 is provided with a lateral connection 64 through which a liquid fog or smoke producing fluid may be introduced under pressure into the air stream supplied through pipe 62. An air outlet pipe 66 is threaded into the wall of chamber 22.

To use the instrument, a spark plug may be removed from the wall of a combustion cylinder to be tested for leakage, and an adapter 68,— fitted to the free end of outlet pipe 66 of the testing instrument,—is screwed into the spark plug socket 70. The engine is now turned over slowly until the piston 72 in the cylinder under test reaches top dead center position on compression stroke, at which point a maximum back pressure develops on the air trapped in chamber 22, as indicated by the gauges 14 and 16 with the valve 54 closed. The brakes of the engine are then set to lock the piston 72 in top dead center position, and if necessary the engine transmission may be set in low gear.

To start the test the air pressure is turned on and the pressure reducing valve 54 is adjusted to bring the pressure on the upstream side of orifice 58 to an optimum test value indicated for example by numeral 1 on the gauge 14. With the air pressure in chambers 18 and 20 at say 50 lbs. gauge, and using an orifice 58 properly calibrated in accordance with the cubical displacement of the cylinder combustion space 74 when the piston is at top dead center and the inlet and exhaust valves of the cylinder closed, it should take about half a minute after the air pressure is admitted to chamber 22 and cylinder space 74 to bring the reading of gauge 16 to a steady equilibrium value. If the piston rings and inlet and exhaust valves of the cylinder under test are tight, the readings of the gauges 14 and 16 should be identical. Normally however, there is always some leakage at the test pressure employed, and this leakage from space 74 results in a differential between the pressure indications of gauges 14 and 16.

Assuming that the calibration point 1 on each gauge represents a pressure of 50 lbs. gauge, then it may be advantageous to calibrate the scale of gauge 16 in 5 lbs. increments, so that the scale covers 5 to 50 lbs. variation below the test pressure. With the point 1 representing 50 lbs. pressure, then the point 5 reading on gauge 16 would indicate a pressure of 30 lbs. in chamber 22, or a pressure differential of 20 lbs. between chambers 20 and 22. Experience has shown that when an automotive cylinder exhibits a leakage factor representing upwards of 20% of the test pressure employed, or in other words when the needle of gauge 16 swings to the left of point 3 with both gauges calibrated for 50 lbs. pressure at point 1 on their scales and point 3 representing a pressure of 40 lbs., then the cylinder needs attention for correction of the condition causing a leakage. Ordinarily no correction is necessary with a leakage farther below 20% of the test pressure.

After the rate of leakage from the cylinder under test has been determined, the points at which serious leakage occurs can be located readily by the following qualitative tests. With a little experience, an operator can judge pretty closely the rate of leakage past the piston rings by the pitch of the whistle thus developed. The whistle can readily be heard by placing the ear close to the oil charging opening of the engine crank case. Leakage of the inlet valve to the cylinder can be detected by feeling the rate of air discharge from the carburetor air inlet. Similarly leakage of air past the exhaust valve can be detected by feeling the rate of air discharge into the exhaust manifold. Visual indications of the rate of air leakage past the valve can be obtained by feeding a smoke-producing fluid such as stannic chloride or titanium tetrachloride in small amounts to the cylinder, as by introduction to the air stream through pipe 64.

One advantage of using two pressure gauges as shown is that the gauge on the upstream side of the orifice 58 accurately registers the pressure at which air is supplied to the instrument. It will be readily appreciated, however, that a single differential gauge with connection to the upstream and downstream side of the orifice 58 may be substituted for the two gauges 14 and 16. Other variations in the instrument design and in the testing steps employed, may obviously be made without departing from the real spirit of the invention.

The invention having been thus described, what is claimed as new is:

1. Flow restricting apparatus adapted for leakage testing, comprising a manifold, an apertured lateral partition dividing said manifold into inlet and outlet chambers, the aperture in said partition having its edges beveled to form a frusto-conical seat, a centrally apertured plug adapted for insertion in one end of said manifold and having its periphery contoured and dimensioned to seat in and close said partition aperture, the aperture in said plug forming a connecting passage between said inlet and outlet chambers, an annular groove formed in the said end of the manifold, a gasket adapted for mounting in said groove, a centrally apertured cap for said plug having a knife edge rim adapted to form a closure seal between the plug and the gasket, a screw cap for the said manifold end adapted for forcing said plug into tight sealing relation with the seat formed by the said partition aperture and with the gasket, a needle valve closure for the plug aperture having a stem threadably journalled in the aperture of the plug cap, and a flow restriction orifice mounted in the passage formed by the central aperture of the plug.

2. Flow restricting apparatus adapted for leakage testing comprising a manifold, an apertured partition dividing said manifold into inlet and outlet chambers, a centrally apertured plug adapted for insertion in an end of said manifold and having its periphery contoured and dimensioned to seat in and close said partition aperture, the aperture in said plug forming a connecting passage between said inlet and outlet chambers, a sealing element formed in the said manifold end, a cap for said plug having a knife edge adapted to form a closure between the plug and said sealing element, means for forcing said plug into tight sealing relation with the seat formed by said partition aperture, and a flow restriction orifice mounted in the passage formed by the central aperture of the plug.

JOHN D. MORGAN.
PERCY B. LEVITT.